US012753895B1

(12) United States Patent
Lin

(10) Patent No.: US 12,753,895 B1
(45) Date of Patent: Oct. 6, 2026

(54) HEADLAMP ASSEMBLY

(71) Applicant: DELTA ELECTRONICS, INC., Taoyuan City (TW)

(72) Inventor: Hung-Ying Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 0 days.

(21) Appl. No.: 19/337,877

(22) Filed: Sep. 23, 2025

(30) Foreign Application Priority Data

May 28, 2025 (CN) ......................... 202510698328.3

(51) Int. Cl.
*F21S 41/25* (2018.01)
*F21S 41/143* (2018.01)

(52) U.S. Cl.
CPC ............. *F21S 41/25* (2018.01); *F21S 41/143* (2018.01)

(58) Field of Classification Search
CPC .......... F21S 41/25; F21S 41/143; F21S 41/20; F21S 41/10; F21S 41/00; F21V 5/00; F21V 5/008; F21W 2102/00
See application file for complete search history.

(56) References Cited

U.S. PATENT DOCUMENTS

2023/0097767 A1* 3/2023 Sato ................... G02B 19/0066 362/539
2023/0114890 A1 4/2023 Okano et al.
2023/0280009 A1* 9/2023 Wang .................... F21S 41/148 362/521
2023/0302986 A1* 9/2023 Schweitzer ........ G02B 19/0014
2025/0290616 A1* 9/2025 Bushre .................. F21S 41/663

FOREIGN PATENT DOCUMENTS

| | | | |
|---|---|---|---|
| CN | 109539164 B | | 11/2020 |
| CN | 112666676 A | | 4/2021 |
| CN | 110186004 B | | 6/2021 |
| CN | 113671663 A | | 11/2021 |
| CN | 114746307 A | | 7/2022 |
| CN | 115095836 A | | 9/2022 |
| CN | 116338899 A | | 6/2023 |
| CN | 116624805 A | | 8/2023 |
| CN | 116677950 | * | 9/2023 |
| TW | 202349058 A | | 12/2023 |
| WO | 2025/033215 | * | 2/2025 |

* cited by examiner

*Primary Examiner* — Bao Q Truong
(74) *Attorney, Agent, or Firm* — CKC & Partners Co., LLC

(57) ABSTRACT

A headlamp assembly includes a light source, a first lens having a positive focal power, a second lens having a negative focal power, a third lens having a positive focal power, and a fourth lens having a positive focal power. A first side and a second side of the first lens opposite to each other are convex surfaces. A first side and a second side of the third lens opposite to each other are convex surfaces. The first, second, third, and fourth lenses are arranged from a light emitting side of the headlamp assembly to a light incident side of the headlamp assembly along an optical axis of the light source. The first, second, third, and fourth lenses define a system focal length, and a ratio of a focal length of the third lens to the system focal length is greater than 2.

15 Claims, 7 Drawing Sheets

110

100c

HEADLAMP ASSEMBLY

CROSS-REFERENCE TO RELATED APPLICATION

This application claims priority to China Application Serial Number 202510698328.3, filed May 28, 2025, which is herein incorporated by reference.

BACKGROUND

Technical Field

The present disclosure relates to a headlamp assembly, and particularly to a headlamp assembly having a plurality of lenses.

Description of Related Art

ADB (Adaptive driving beam headlamp) is a vehicle lighting system that automatically adjusts light beams, which can not only enhance the illumination effect in the area ahead of the vehicle itself, but also prevent glare to vehicles such as preceding vehicles or oncoming vehicles present in that forward area. During use, the vehicle position detection device can first detect vehicles ahead. ADB light distribution control reduces the light quantity or turns off the light for the area of the preceding vehicle, while brightly illuminating other areas.

Generally, a projection lens for a vehicle lamp, which is a high-definition projection lens enabling clear-cut illumination area boundaries, mostly consists of three lenses, and there are specific relationships between the spacings of respective lenses. However, the aperture of a three-lens structure lens is small, which prevents the lens from collecting large-angle light emitted by the light source, resulting in energy loss. Furthermore, the three lenses may need to be aspherical lenses to achieve imaging resolution, which causes a complex design. Moreover, when their materials are resin, they are prone to significant changes in focal length due to temperature variations, causing problems of degraded focusing quality.

SUMMARY

According to some embodiments of the present disclosure, a headlamp assembly comprises a light source, a first lens, a second lens, a third lens, and a fourth lens. The first lens has a positive optical power. The first lens has a first side and a second side that are opposite to each other, both the first side and the second side of the first lens are convex surfaces, and a focal length of the first lens is less than or equal to 50 millimeters. The second lens has a negative optical power. The third lens has a positive optical power. The third lens has a first side and a second side that are opposite to each other, and both the first side and the second side of the third lens are convex surfaces. The fourth lens has a positive optical power. The first, second, third, and fourth lenses are arranged in sequence from a light emitting side of the headlamp assembly to a light incident side of the headlamp assembly along an optical axis of the light source. The first, second, third, and fourth lenses define a system focal length, and a ratio of afocal length of the third lens to the system focal length is greater than 2.

In some embodiments, the second lens has a first side and a second side that are opposite to each other, the first side of the second lens faces the first lens and is a concave surface, the second side of the second lens faces the third lens and is a convex surface, the fourth lens has a first side and a second side that are opposite to each other, the first side of the fourth lens faces the third lens and is a convex surface, and the second side of the fourth lens faces the light source and is a concave surface.

In some embodiments, each of the first, second, third, and fourth lenses is a single lens.

In some embodiments, the ratio of the focal length of the third lens to the system focal length is less than 2.5.

In some embodiments, the focal length of the first lens and the focal length of the third lens are substantially the same.

In some embodiments, a ratio of the focal length of the first lens to the system focal length is in a range from 1.5 to 3.

In some embodiments, a ratio of the focal length of the first lens to a diameter of the first lens is less than 1.1.

In some embodiments, the headlamp assembly further comprises an aperture stop. The aperture stop is located between the second lens and the third lens.

In some embodiments, a ratio of the system focal length to a diameter of the aperture stop is an f-number, and the f-number is less than 0.7.

In some embodiments, the second lens is located between the first lens and the aperture stop, and the third lens is located between the aperture stop and the fourth lens.

In some embodiments, the system focal length is in a range from 15 millimeters to 25 millimeters.

In some embodiments, the diameter of the first lens is greater than 40 millimeters and less than 60 millimeters.

In some embodiments, a material of the second lens is flint glass or heavy flint glass, and materials of the first lens, the third lens and the fourth lens are lanthanum crown glass, lanthanum flint glass, or heavy lanthanum crown glass.

In some embodiments, the light source is a micro light-emitting diode array light panel.

According to some embodiments of the present disclosure, a headlamp assembly includes a light source, a first lens, a second lens, a third lens, and a fourth lens. The first lens has a positive optical power. A focal length of the first lens is less than or equal to 50 millimeters. The second lens has a negative optical power. The third lens has a positive optical power. The fourth lens has a positive optical power. The first, second, third, and fourth lenses are arranged in sequence from a light emitting side of the headlamp assembly to a light incident side of the headlamp assembly along an optical axis of the light source. The first, second, third, and fourth lenses define a system focal length, and a ratio of a focal length of the third lens to the system focal length is greater than 2 and less than 2.5.

In the above embodiments of the present disclosure, since the first lens of the headlamp assembly has a positive optical power, the second lens has a negative optical power, the third lens has a positive optical power, the fourth lens has a positive optical power, the focal length of the first lens is less than or equal to 50 millimeters, and the ratio of the focal length of the third lens to the system focal length is greater than 2, when the fourth lens is adjacent to the light source, a large light collection angle can be obtained and an objective of imaging resolution can be achieved, thereby enabling the headlamp assembly to effectively improve the light collection efficiency.

BRIEF DESCRIPTION OF THE DRAWINGS

Aspects of the present disclosure may be best understood with reference to the following embodiments when read in conjunction with the accompanying drawings. It is noted that according to standard practice in the industry, various features are not drawn to scale. In fact, the dimensions of various features may be arbitrarily increased or decreased for clarity of discussion.

DETAILED DESCRIPTION

Figure 1:
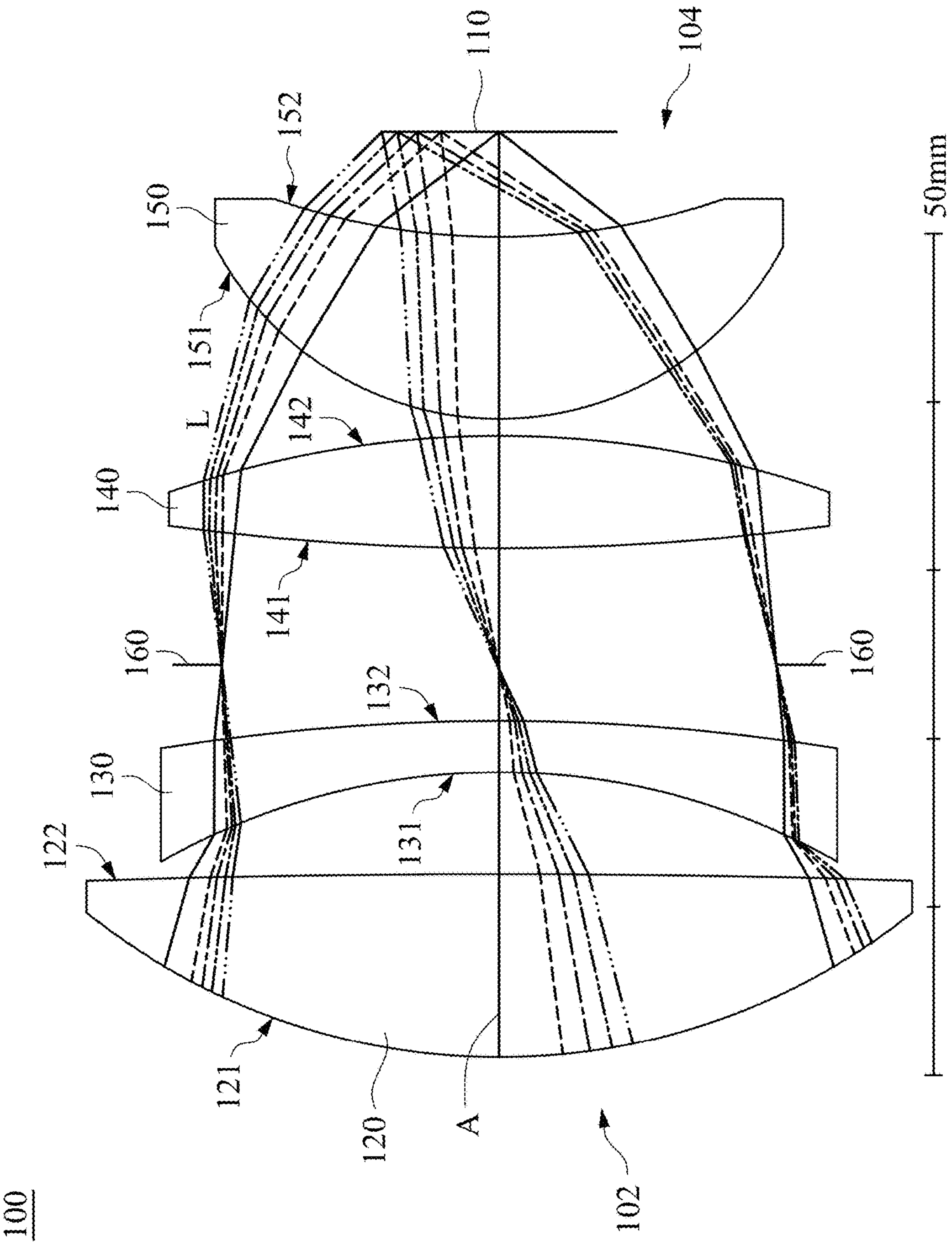
FIG. 1 illustrates a schematic structural diagram of a headlamp assembly according to an embodiment of the present disclosure.

The embodiments disclosed below provide many different embodiments or examples for implementing various features of the provided subject matter. Specific examples of components and arrangements are described below to simplify the present case. Of course, these examples are merely examples and are not intended to be limiting. Moreover, reference numerals and/or letters in various examples may be repeated in the present case. Such repetition is for the purpose of simplicity and clarity and does not in itself indicate a relationship between the discussed embodiments and/or configurations.

Spatially relative terms such as “beneath,” “below,” “lower,” “above,” “upper,” and the like may be used herein for ease of description to describe a relationship of one element or feature to another element or feature as illustrated in the drawings. The spatially relative terms are intended to encompass different orientations of the apparatus in use or operation in addition to the orientation depicted in the drawings. The apparatus may be oriented in other ways (rotated 90 degrees or in other orientations), and the spatially relative descriptors used herein are to be interpreted accordingly.

FIG. 1 illustrates a schematic structural diagram of a headlamp assembly 100 according to an embodiment of the present disclosure. The headlamp assembly 100 includes a light source 110, a first lens 120, a second lens 130, a third lens 140, and a fourth lens 150. The first lens 120 has a positive optical power. The first lens 120 has a first side 121 and a second side 122 that are opposite to each other. Both the first side 121 and the second side 122 of the first lens 120 are convex surfaces, and a focal length of the first lens 120 is less than or equal to 50 millimeters. In the present embodiment, the focal length of the first lens 120 may be 42.256 millimeters. The second lens 130 has a negative optical power. The third lens 140 has a positive optical power. The third lens 140 has a first side 141 and a second side 142 that are opposite to each other. Both the first side 141 and the second side 142 of the third lens 140 are convex surfaces. The fourth lens 150 has a positive optical power. The headlamp assembly 100 has a light emitting side 102 and a light incident side 104. The first lens 120, the second lens 130, the third lens 140, and the fourth lens 150 are arranged in sequence from the light emitting side 102 to the light incident side 104 along an optical axis A of the light source 110. The first lens 120, the second lens 130, the third lens 140, and the fourth lens 150 define a system focal length, and a ratio of afocal length of the third lens 140 to the system focal length is greater than 2. In the present embodiment, the focal length of the third lens 140 may be 50.874 millimeters, and the system focal length may be 25.186 millimeters. Moreover, the ratio of the focal length of the third lens 140 to the system focal length is less than 2.5.

In some embodiments, the headlamp assembly 100 can be applied to an Adaptive Driving Beam headlamp (ADB) of a vehicle. The light source 110 may be a micro light-emitting diode array (μLED array) light panel. These micro light-emitting diodes can be independently controlled for on/off switching. Thereby, when an oncoming vehicle appears, the illumination position of the light beam can be promptly adjusted to avoid endangering the safety of the driver of the oncoming vehicle. The headlamp assembly 100 complies with the requirements of Regulation ECE R149, and simultaneously meets the requirements for both low beam and high beam.

Furthermore, each of the first lens 120, the second lens 130, the third lens 140, and the fourth lens 150 is a single lens. A material of the negative lens (e.g., the second lens 130) may be flint (F) glass or heavy flint (ZF) glass with high refractive index and high dispersion, having a high negative optical power; while materials of the positive lenses at both ends (e.g., the first lens 120, the third lens 140, and the fourth lens 150) may be lanthanum crown (LAK) glass, lanthanum flint (LAF) glass, or heavy lanthanum crown (ZLAF) glass with high refractive index and low dispersion.

Specifically, since the first lens 120 of the headlamp assembly 100 has a positive optical power, the second lens 130 has a negative optical power, the third lens 140 has a positive optical power, the fourth lens 150 has a positive optical power, the focal length of the first lens 120 is less than or equal to 50 millimeters, and the ratio of the focal length of the third lens 140 to the system focal length is greater than 2, when the fourth lens 150 is adjacent to the light source 110, a large light collection angle (e.g., greater than 46×2 degrees) can be obtained and an objective of imaging resolution (e.g., working f-number WFNO is less than 0.7) can be achieved, thereby enabling the headlamp assembly 100 to effectively improve the light collection efficiency.

In some embodiments, a ratio of the focal length of the first lens 120 to the system focal length is in a range from 1.5 to 3, a ratio of the focal length of the first lens 120 to a diameter of the first lens 120 is less than 1.1, and the diameter of the first lens 120 is greater than 40 millimeters and less than 60 millimeters. For example, the focal length of the first lens 120 may be 42.256 millimeters, the system focal length may be 25.186 millimeters, and the diameter of the first lens 120 may be 48.702 millimeters.

Furthermore, the headlamp assembly 100 further includes an aperture stop 160. The aperture stop 160 is located between the second lens 130 and the third lens 140. A ratio of the system focal length to a diameter of the aperture stop 160 is an f-number, and the f-number is less than 0.7.

The numerical values mentioned above can be referred to in Table 1 below, where Embodiment 1 represents the lens design of the headlamp assembly 100 of FIG. 1, Embodiment 2 represents the lens design of a headlamp assembly 100*a* of FIG. 2, Embodiment 3 represents the lens design of a headlamp assembly 100*b* of FIG. 4, Embodiment 4 represents the lens design of a headlamp assembly 100*c* of FIG. 6, and Embodiment 5 represents the lens design of a headlamp assembly 100*d* of FIG. 7.

TABLE 1

| | Embodiment 1 | Embodiment 2 | Embodiment 3 | Embodiment 4 | Embodiment 5 |
|---|---|---|---|---|---|
| System focal length | 25.186 | 23.042 | 19.984 | 18.577 | 16.881 |
| Focal length of the first lens | 42.256 | 45.584 | 46.975 | 43.550 | 41.662 |
| Focal length of the third lens | 50.874 | 46.332 | 42.030 | 41.763 | 46.006 |
| Ratio of a focal length of the third lens to the system focal length | 2.020 | 2.011 | 2.103 | 2.248 | 2.725 |
| Working f-number | 0.638 | 0.646 | 0.657 | 0.652 | 0.783 |
| Diameter of the first lens | 48.702 | 45.748 | 42.830 | 41.206 | 39.626 |
| Ratio of the focal length of the first lens to a diameter of the first lens | 0.868 | 0.996 | 1.097 | 1.057 | 1.051 |
| Spot size | 53 × 2 | 71 × 2 | 99 × 2 | 123 × 2 | 132 × 2 |

In some embodiments, the second lens 130 is located between the first lens 120 and the aperture stop 160, and the third lens 140 is located between the aperture stop 160 and the fourth lens 150. The second lens 130 has a first side 131 and a second side 132 that are opposite to each other, the first side 131 of the second lens 130 faces the first lens 120 and is a concave surface, and the second side 132 of the second lens 130 faces the third lens 140 and is a convex surface. The fourth lens 150 has a first side 151 and a second side 152 that are opposite to each other, the first side 151 of the fourth lens 150 faces the third lens 140 and is a convex surface, and the second side 152 of the fourth lens 150 faces the light source 110 and is a concave surface.

It should be understood that descriptions of connection relationships, materials, and effects of components already stated will not be repeated herein, and this is stated in advance for completeness. In the following description, other lens configurations of the headlamp assembly will be explained.

Figure 2:
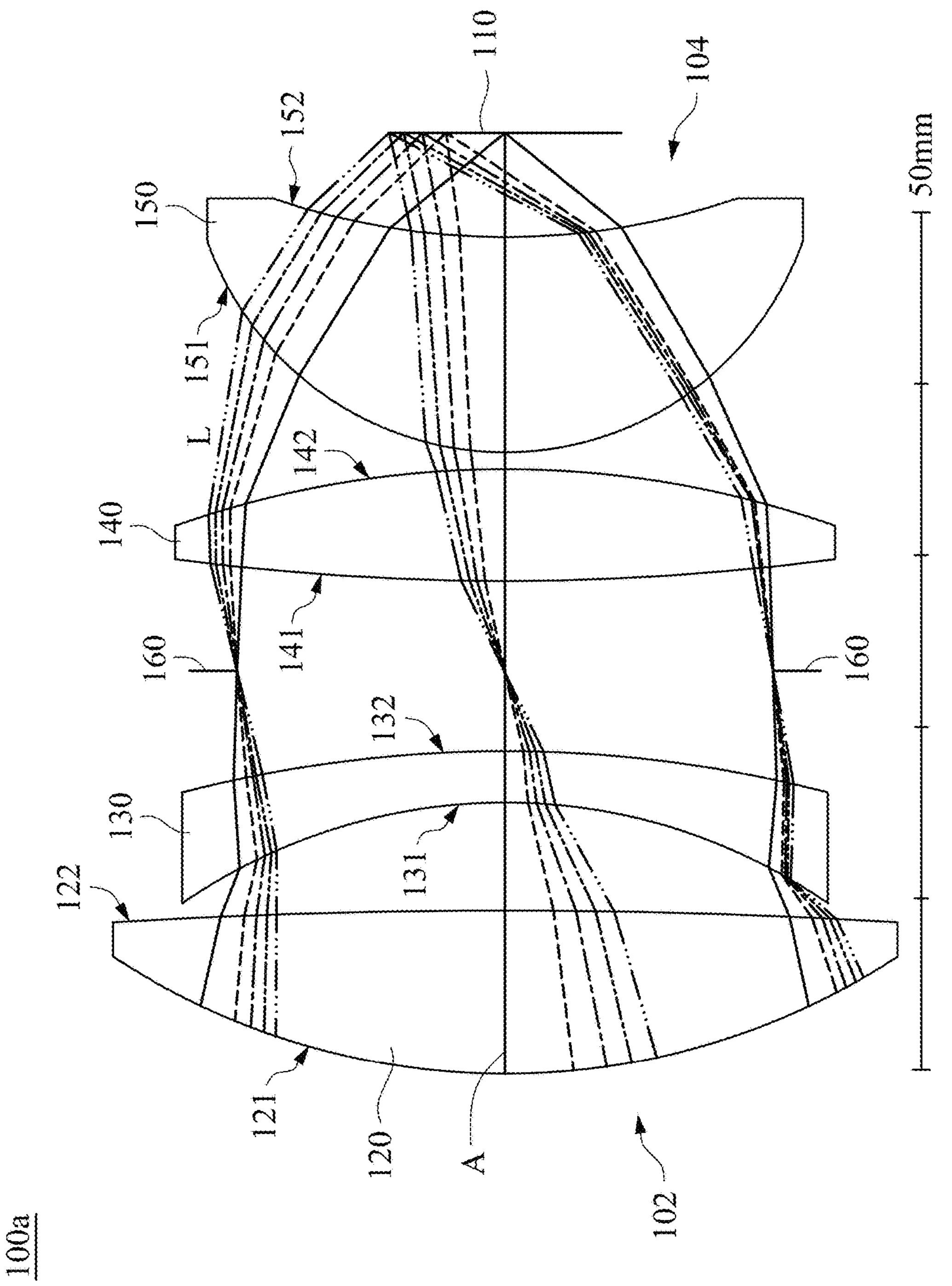
FIG. 2 illustrates a schematic structural diagram of a headlamp assembly according to another embodiment of the present disclosure.

FIG. 2 illustrates a schematic structural diagram of the headlamp assembly 100*a* according to another embodiment of the present disclosure. The headlamp assembly 100*a* includes a light source 110, a first lens 120, a second lens 130, a third lens 140, and a fourth lens 150. The present embodiment differs from the embodiment in FIG. 1 in that afocal length of the first lens 120 and afocal length of the third lens 140 of the headlamp assembly 100*a* are substantially the same, and a system focal length is in a range from 15 millimeters to 25 millimeters. Referring to Embodiment 2 in Table 1, the focal length of the first lens 120 of the headlamp assembly 100*a* may be 45.584 millimeters, the focal length of the third lens 140 may be 46.332 millimeters, the system focal length may be 23.042 millimeters, and a diameter of the first lens 120 may be 45.748 millimeters. Furthermore, a horizontal field of view (HFOV) of the headlamp assembly 100*a* is approximately 32 degrees, a total length from the light source 110 to the first side 121 of the first lens 120 is approximately 55 millimeters, and a working f-number (WFNO) is approximately 0.65.

Figure 3:
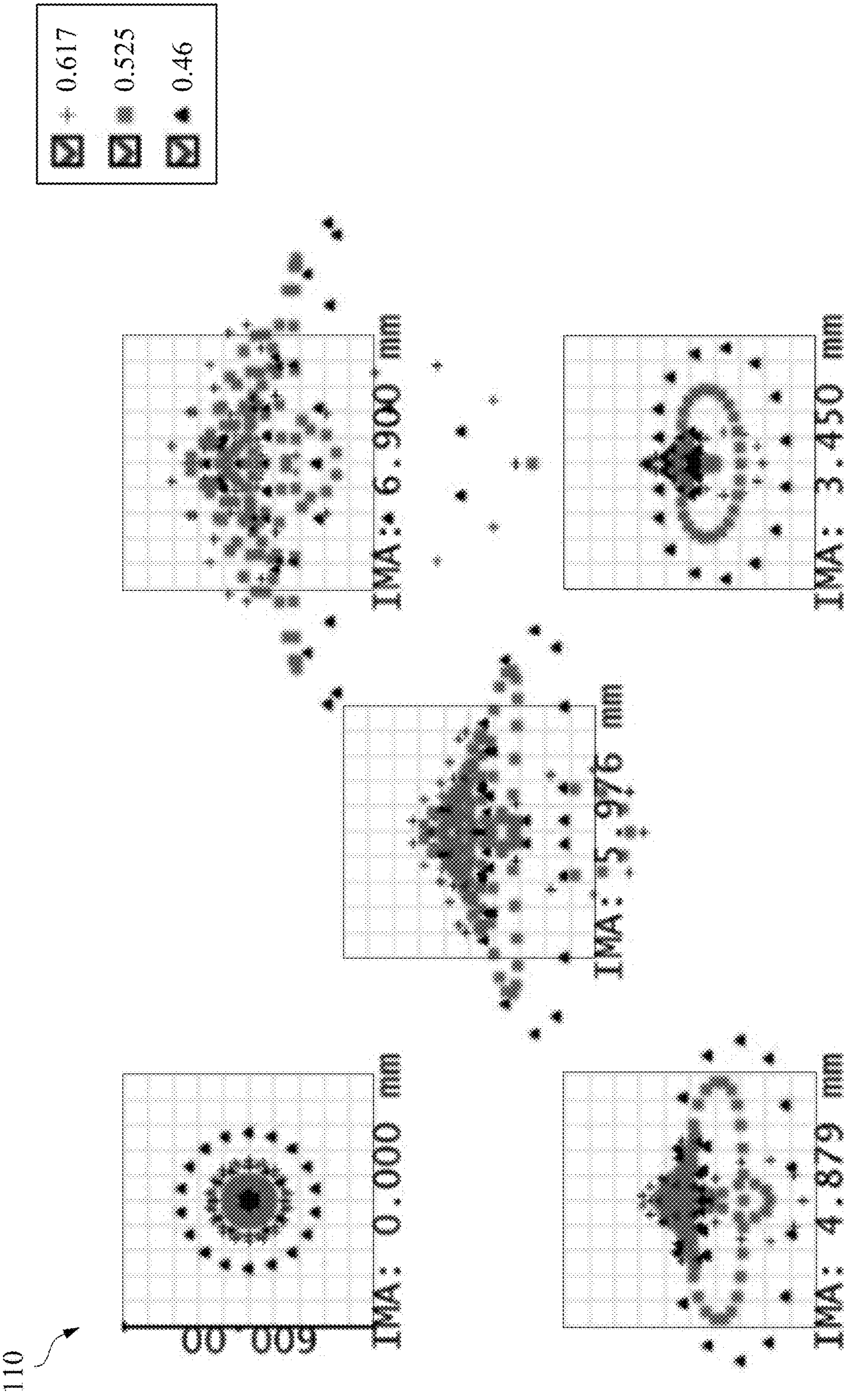
FIG. 3 illustrates a spot diagram of the headlamp assembly of FIG. 2.

FIG. 3 illustrates a spot diagram of the headlamp assembly 100*a* of FIG. 2. As can be seen from FIG. 3, a defocus spot diameter at each field of view is relatively small, indicating that a projection lens (i.e., combination of the first lens 120, second lens 130, third lens 140, and fourth lens 150) of the headlamp assembly 100*a* exhibits good imaging performance.

Figure 4:
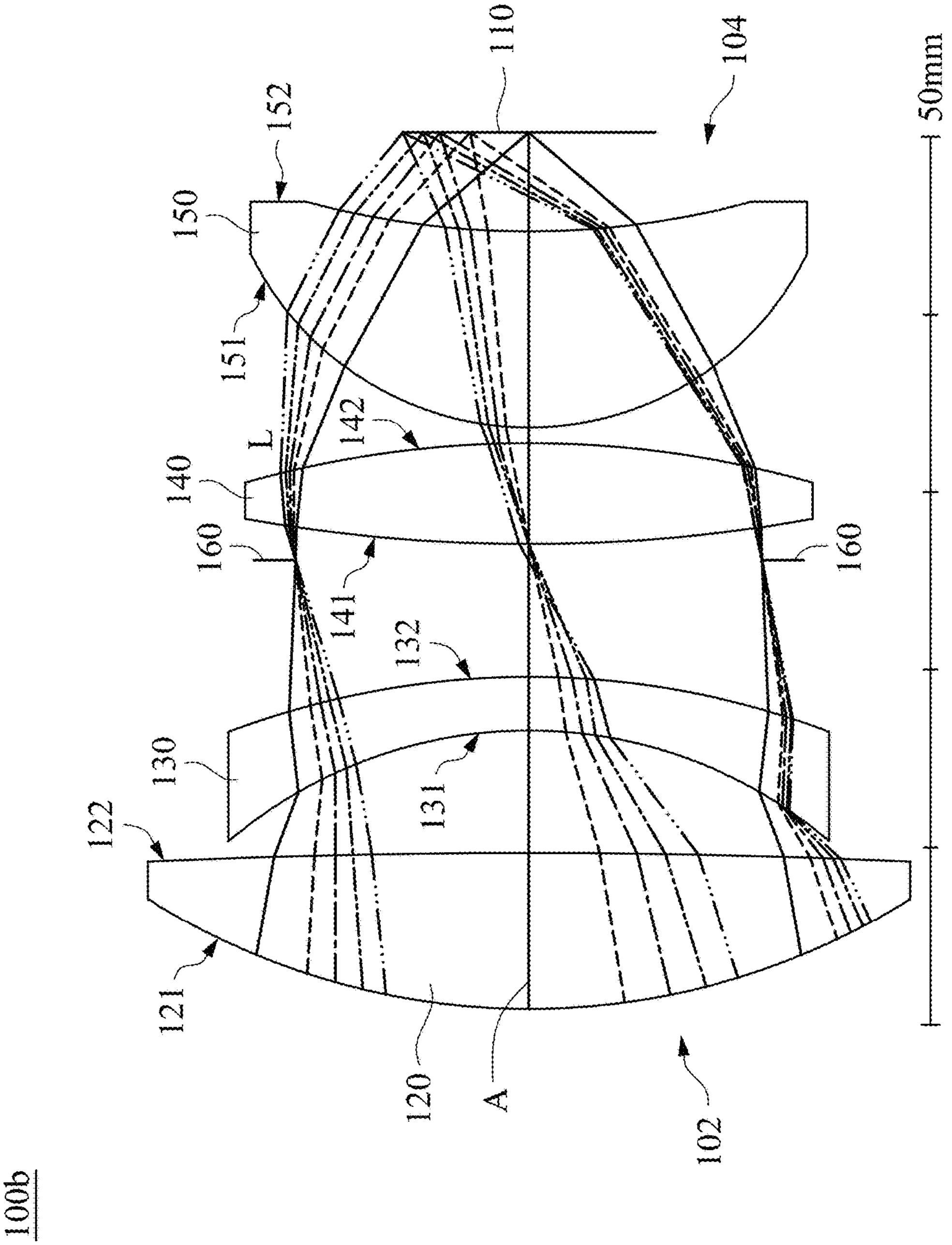
FIG. 4 illustrates a schematic structural diagram of a headlamp assembly according to yet another embodiment of the present disclosure.

FIG. 4 illustrates a schematic structural diagram of the headlamp assembly 100*b* according to yet another embodiment of the present disclosure. The headlamp assembly 100*b* includes a light source 110, a first lens 120, a second lens 130, a third lens 140, and a fourth lens 150. The present embodiment differs from the embodiment in FIG. 1 in that a focal length of the first lens 120 and a focal length of the third lens 140 of the headlamp assembly 100*b* are substantially the same, and a system focal length is in a range from 15 millimeters to 25 millimeters. Referring to Embodiment 3 in Table 1, the focal length of the first lens 120 of the headlamp assembly 100*b* may be 46.975 millimeters, the focal length of the third lens 140 may be 42.030 millimeters, the system focal length may be 19.984 millimeters, and a diameter of the first lens 120 may be 42.83 millimeters. Furthermore, a horizontal field of view (HFOV) of the headlamp assembly 100*b* is approximately 38 degrees, a total length from the light source 110 to the first side 121 of the first lens 120 is approximately 50 millimeters, and a working f-number (WFNO) is approximately 0.66.

Figure 5:
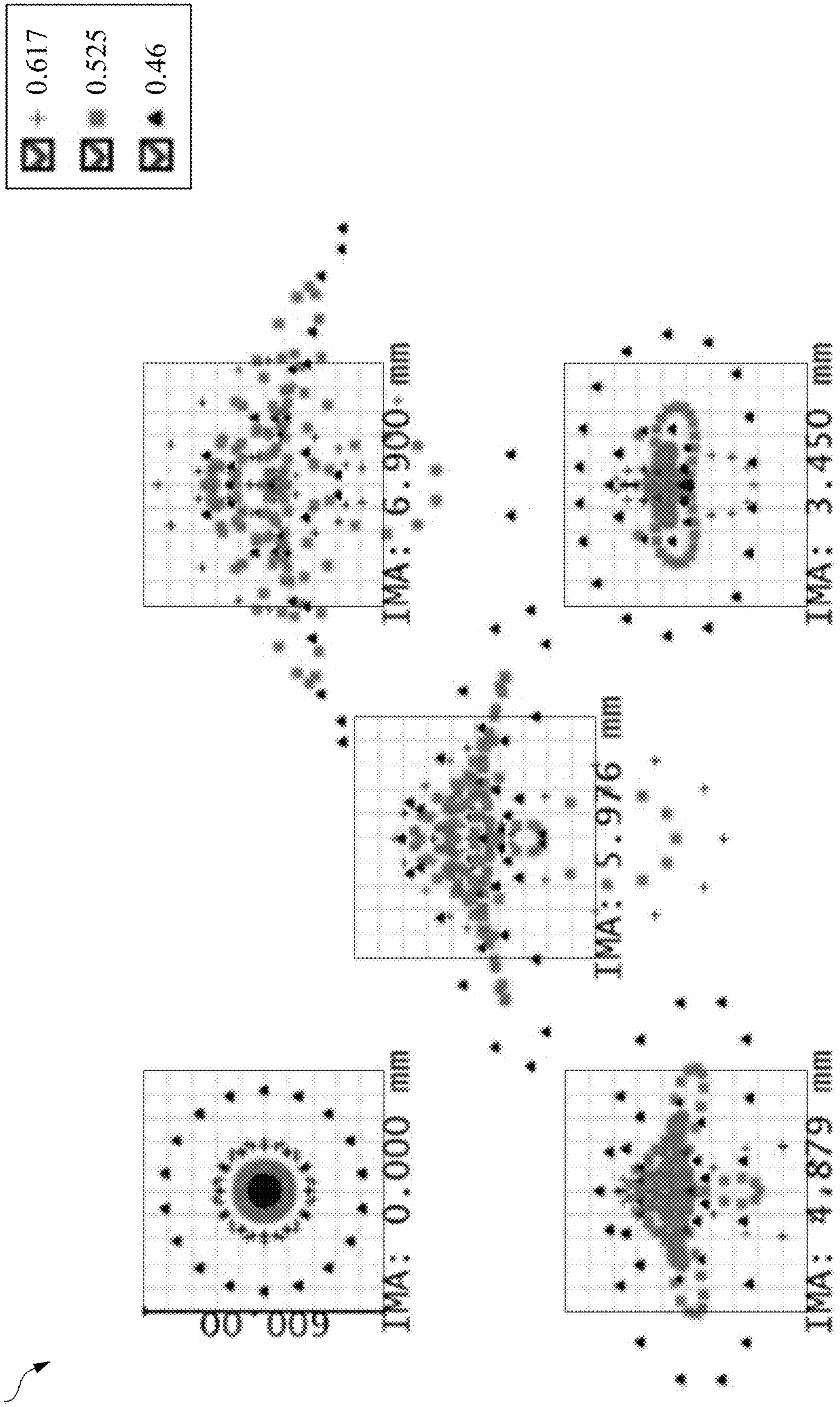
FIG. 5 illustrates a light spot diagram of the headlamp assembly of FIG. 4.

FIG. 5 illustrates a spot diagram of the headlamp assembly 100*b* of FIG. 4. As can be seen from FIG. 5, a defocus spot diameter at each field of view is relatively small, indicating that a projection lens (i.e., combination of the first lens 120, second lens 130, third lens 140, and fourth lens 150) of the headlamp assembly 100*b* exhibits good imaging performance.

Figure 6:
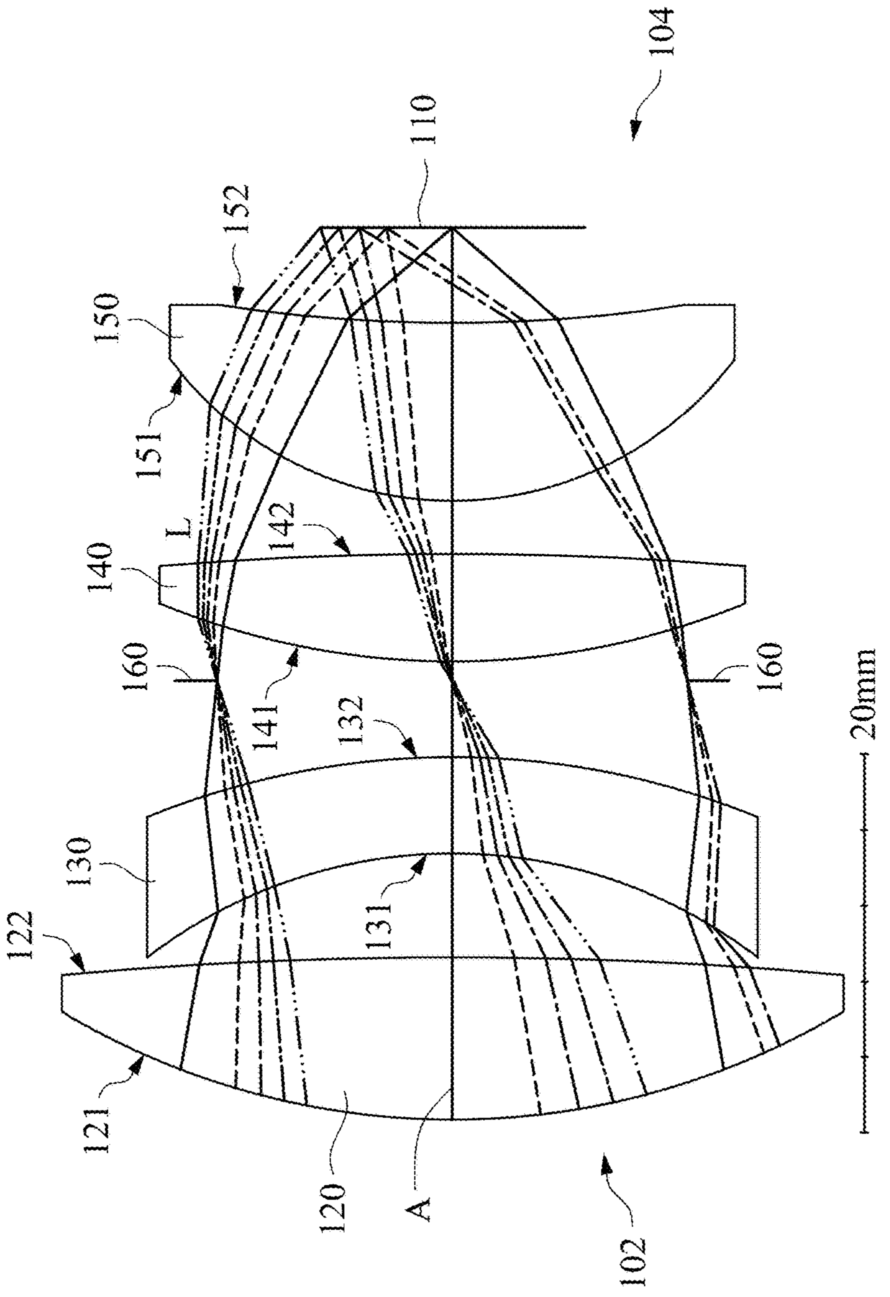
FIG. 6 illustrates a schematic structural diagram of a headlamp assembly according to still another embodiment of the present disclosure.

FIG. 6 illustrates a schematic structural diagram of the headlamp assembly 100*c* according to still another embodiment of the present disclosure. The headlamp assembly 100*c* includes a light source 110, a first lens 120, a second lens 130, a third lens 140, and a fourth lens 150. The present embodiment differs from the embodiment in FIG. 1 in that a focal length of the first lens 120 and a focal length of the third lens 140 of the headlamp assembly 100*c* are substantially the same, and a system focal length is in a range from 15 millimeters to 25 millimeters. Referring to Embodiment 4 in Table 1, the focal length of the first lens 120 of the headlamp assembly 100*c* may be 43.550 millimeters, the focal length of the third lens 140 may be 41.763 millimeters, the system focal length may be 18.577 millimeters, and a diameter of the first lens 120 may be 41.206 millimeters.

Figure 7:
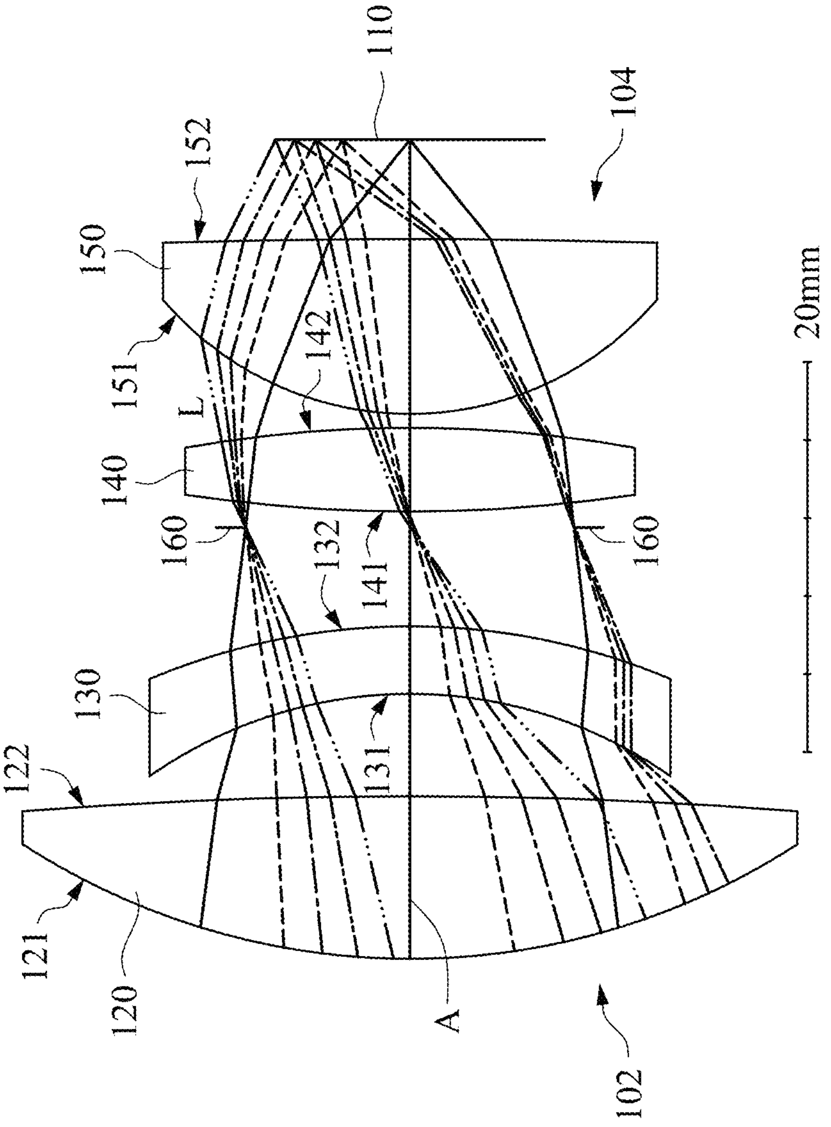
FIG. 7 illustrates a schematic structural diagram of a headlamp assembly according to an embodiment of the present disclosure.

FIG. 7 illustrates a schematic structural diagram of the headlamp assembly 100*d* according to an embodiment of the present disclosure. The headlamp assembly 100*d* includes a light source 110, a first lens 120, a second lens 130, a third lens 140, and a fourth lens 150. The present embodiment differs from the embodiment in FIG. 1 in that a second side 152 of the fourth lens 150 of the headlamp assembly 100*d* is a convex surface, a focal length of the first lens 120 and a focal length of the third lens 140 are substantially the same, a system focal length is in a range from 15 millimeters to 25 millimeters, and a diameter of the first lens 120 is less than 40 millimeters. Referring to Embodiment 5 in Table 1, the focal length of the first lens 120 of the headlamp assembly 100*d* may be 43.550 millimeters, the focal length of the third lens 140 may be 46.006 millimeters, the system focal length may be 16.881 millimeters, and the diameter of the first lens 120 may be 39.626 millimeters.

The foregoing outlines the features of several embodiments to enable those skilled in the art to better understand the aspects of the present disclosure. Those skilled in the art should understand that they may readily use the present disclosure as a basis for designing or modifying other processes and structures to accomplish the same objectives and/or achieve the same advantages as the embodiments described herein. Those skilled in the art should also recognize that such equivalent constructions do not depart from the spirit and scope of the present disclosure, and that various changes, substitutions, and alterations may be made herein without departing from the spirit and scope of the present disclosure.

What is claimed is:

1. A headlamp assembly, comprising:

a light source;

a first lens having a positive focal power, wherein the first lens has a first side and a second side that are opposite to each other, both the first side and the second side of the first lens are convex surfaces, and a focal length of the first lens is less than or equal to 50 millimeters;

a second lens having a negative optical power;

a third lens having a positive optical power, wherein the third lens has a first side and a second side that are opposite to each other, and both the first side and the second side of the third lens are convex surfaces; and a fourth lens having a positive optical power, wherein the first, second, third, and fourth lenses are arranged in sequence from a light emitting side of the headlamp assembly to a light incident side of the headlamp assembly along an optical axis of the light source, the first, second, third, and fourth lenses define a system focal length, and a ratio of afocal length of the third lens to the system focal length is greater than 2.

2. The headlamp assembly of claim 1, wherein the second lens has a first side and a second side that are opposite to each other, the first side of the second lens faces the first lens and is a concave surface, the second side of the second lens faces the third lens and is a convex surface, the fourth lens has a first side and a second side that are opposite to each other, the first side of the fourth lens faces the third lens and is a convex surface, and the second side of the fourth lens faces the light source and is a concave surface.

3. The headlamp assembly of claim 1, wherein each of the first, second, third, and fourth lenses is a single lens.

4. The headlamp assembly of claim 1, wherein the ratio of the focal length of the third lens to the system focal length is less than 2.5.

5. The headlamp assembly of claim 1, wherein the focal length of the first lens and the focal length of the third lens are substantially the same.

6. The headlamp assembly of claim 1, wherein a ratio of the focal length of the first lens to the system focal length is in a range from 1.5 to 3.

7. The headlamp assembly of claim 1, wherein a ratio of the focal length of the first lens to a diameter of the first lens is less than 1.1.

8. The headlamp assembly of claim 1, further comprising:

an aperture stop located between the second lens and the third lens.

9. The headlamp assembly of claim 8, wherein a ratio of the system focal length to a diameter of the aperture stop is an f-number, and the f-number is less than 0.7.

10. The headlamp assembly of claim 8, wherein the second lens is located between the first lens and the aperture stop, and the third lens is located between the aperture stop and the fourth lens.

11. The headlamp assembly of claim 1, wherein the system focal length is in a range from 15 millimeters to 25 millimeters.

12. The headlamp assembly of claim 1, wherein a diameter of the first lens is greater than 40 millimeters and less than 60 millimeters.

13. The headlamp assembly of claim 1, wherein a material of the second lens is flint glass or heavy flint glass, and materials of the first lens, the third lens and the fourth lens are lanthanum crown glass, lanthanum flint glass, or heavy lanthanum crown glass.

14. The headlamp assembly of claim 1, wherein the light source is a micro light-emitting diode array light panel.

15. A headlamp assembly, comprising:

a light source;

a first lens having a positive optical power, wherein a focal length of the first lens is less than or equal to 50 millimeters;

a second lens having a negative optical power;

a third lens having a positive optical power; and a fourth lens having a positive optical power, wherein the first, second, third, and fourth lenses are arranged in sequence from a light emitting side of the headlamp assembly to a light incident side of the headlamp assembly along an optical axis of the light source, the first, second, third, and fourth lenses define a system focal length, and a ratio of afocal length of the third lens to the system focal length is greater than 2 and less than 2.5.

* * * * *